(12) United States Patent
Chang et al.

(10) Patent No.: US 6,542,996 B1
(45) Date of Patent: Apr. 1, 2003

(54) METHOD OF IMPLEMENTING ENERGY-SAVING SUSPEND-TO-RAM MODE

(75) Inventors: Nai-Shung Chang, Taipei Hsien (TW); Jang-Lih Hsieh, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/459,771

(22) Filed: Dec. 13, 1999

(30) Foreign Application Priority Data

Sep. 6, 1999 (TW) ........................................ 88115320 A

(51) Int. Cl.$^7$ ................................................ G06F 1/32
(52) U.S. Cl. ........................................ 713/300; 713/320
(58) Field of Search ................................ 713/300, 310, 713/320, 322, 323, 324, 601

(56) References Cited

U.S. PATENT DOCUMENTS 6,098,174 A * 8/2000 Baron et al. ................ 713/300
6,212,599 B1 * 4/2001 Baweja et al. .............. 711/106
6,347,379 B1 * 2/2002 Dai et al. .................... 713/320
6,389,556 B1 * 5/2002 Qureshi ........................ 714/15
6,405,320 B1 * 6/2002 Lee et al. .................... 713/300

* cited by examiner

*Primary Examiner*—Dennis M. Butler
(74) *Attorney, Agent, or Firm*—J.C. Patents

(57) ABSTRACT

A method and the associated devices for implementing a suspend-to-RAM (STR) mode of operation in a computer system utilizing the self-refreshing capability of synchrotron DRAM. To switch into the STR mode of operation, system memory data in a first control chip (the north bridge) is first transferred to a memory unit under the direction of a second control chip (the south bridge). The voltage level at the clock-enable pin of the system memory is pulled down under the direction of the south bridge or the north bridge. Power to the north bridge is cut upon receiving a signal from a basic input/output system.

22 Claims, 3 Drawing Sheets

METHOD OF IMPLEMENTING ENERGY-SAVING SUSPEND-TO-RAM MODE

CROSS-REFERENCE TO RELATED APPLICATION

This application claims the priority benefit of Taiwan application serial no. 88115320, filed Sep. 6, 1999.

BACKGROUND OF THE INVENTION

1. Field of Invention

The present invention relates to a power management control circuit for a computer system. More particularly, the present invention relates to a power management control circuit for implementing a suspend-to-RAM mode of operation in a microprocessor-based personal computer or workstation.

2. Description of Related Art

Ever since the introduction of an ATX specification for the main board of a personal computer by Intel Corporation of America, a power supplier is no longer a passively controlled mechanical switch just for providing power to a computer system. Not long thereafter, Intel, Microsoft and Toshiba together introduced an advanced configuration and power interface (ACPI) specification that particularly specifies four idling states representing the level of activity within a computer system. Depending on the amount of activities within a computer, energy can be saved by removing power from some devices. In the ACPI specification, the amount of activities from small to large is in the order of: State 1, stopping the CPU clock; state 2, suspending activities to RAM; state 3, suspending activities to disk; and, state 4, soft off. When the RAM is suspended, all other clock pulses except the real-time clock on the main circuit board are stopped temporarily. Under such circumstances, the CPU and other electric circuits stop working due to the absence of input clock pulses.

Many different types of memories are available in the market for use inside a computer system. Examples are fast page (FP) memory, extended data out (EDO) memory, and synchrotron dynamic random access memory (SDRAM). In general, each type of memory has its own particular characteristics. Hence, when system manufacturers design the suspend-to-RAM (STR) circuit, the manufacturers have to consider the characteristics of the particular type of memory used inside the computer. For example, if EDO memory is used, the north bridge circuit of a chipset still has to be powered up in the STR mode because all EDO memories need refreshing. In contrast, since SDRAM has self-refreshing properties, there is no need to supply power to the north bridge when the STR mode is activated. FIG. 1 is a timing diagram showing the signals on various control lines of SDRAM. As shown in FIG. 1, when a clock-enable CKE pin of an SDRAM is pulled down to a low voltage level, the SDRAM is in a self-refreshing mode. On the other hand, when the CKE pin is pulled up to a high voltage level, the SDRAM returns back from the self-refreshing mode. Due to the versatility of the SDRAM, EDO memory is gradually replaced in newer generation of computers. Therefore, method of implementing the energy-saving STR mode utilizing the special properties of SDRAM can be introduced.

SUMMARY OF THE INVENTION

Accordingly, the purpose of the present invention is to provide a system for implementing an energy-saving suspend-to-RAM (STR) mode of operation such that power to a north bridge circuit can be completely cut when the STR mode is activated.

A second purpose of the invention is to provide a system for implementing an energy-saving STR mode of operation such that data related to the system memory stored within the north bridge is temporarily transferred somewhere else. Hence, data can be returned to the north bridge immediately after the STR mode is over, and the re-establishment of system memory parameters from scratch can be avoided.

To achieve these and other advantages and in accordance with the purpose of the invention, as embodied and broadly described herein, the invention provides an installation capable of implementing the energy-saving STR mode of operation in a computer system. The installation includes a first control chip (for example, a north bridge) having a register therein for storing system memory data; a second control chip (for example, a south bridge) coupled to the first control chip, wherein the second control chip acts according to the signal coming from a basic input/output system (BIOS) for stopping the power to the first control chip; a voltage converter coupled to the second control chip and the clock pulse pin of a system memory, wherein the voltage converter is used for pulling down the potential at the clock-enable pin of the system memory; and a memory unit coupled to the second control chip for temporarily storing data inside the register. When the STR mode is activated by the computer system, data inside the register is transferred to the memory unit. Voltage level at the clock-enable pin of the system memory is next pulled down by the second control chip. Lastly, power to the first control chip is cut off when signaled to do so by the BIOS, and so the computer system is switched into the STR mode of operation.

Although potential at the clock-enable pin is pulled down by the second control chip in the aforementioned illustration, the potential can also be designed to be pulled down by the first control chip, instead. In addition, the memory unit can be implemented using CMOS RAM or EEPROM within the second control chip or alternatively by using an external EEPROM connected by a bus.

The invention also provides a method of implementing an energy-saving STR mode of operation in a computer system. The computer system includes a central processing unit (CPU), a first control chip (north bridge) coupled to the CPU, a second control chip (south bridge), and a system memory. The first control chip and the second control chips are respectively coupled to a bus. The system memory is coupled to the first control chip. The first step in implementing STR mode of operation is for the computer system to decide whether the system needs to switch into a STR mode or needs to return from a STR mode. If the system needs to enter a STR mode, data stored in the register of the first control chip are transferred to a memory unit via the second control chip. Voltage level at a clock-enable pin of the system memory is next pulled down. The second control chip then cuts off power to the first control chip according to a signal returned from the BIOS, and so the computer system runs in the STR mode. On the other hand, if the computer system is already in the STR mode and needs to return to a normal mode, the second control chip returns power to the first control chip on being signaled by the BIOS. Voltage level at the clock-enable pin of the system memory is pulled up. The second control chip controls the transmission of data from the memory unit back to the register, thereby returning the computer system to the normal mode of operation.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
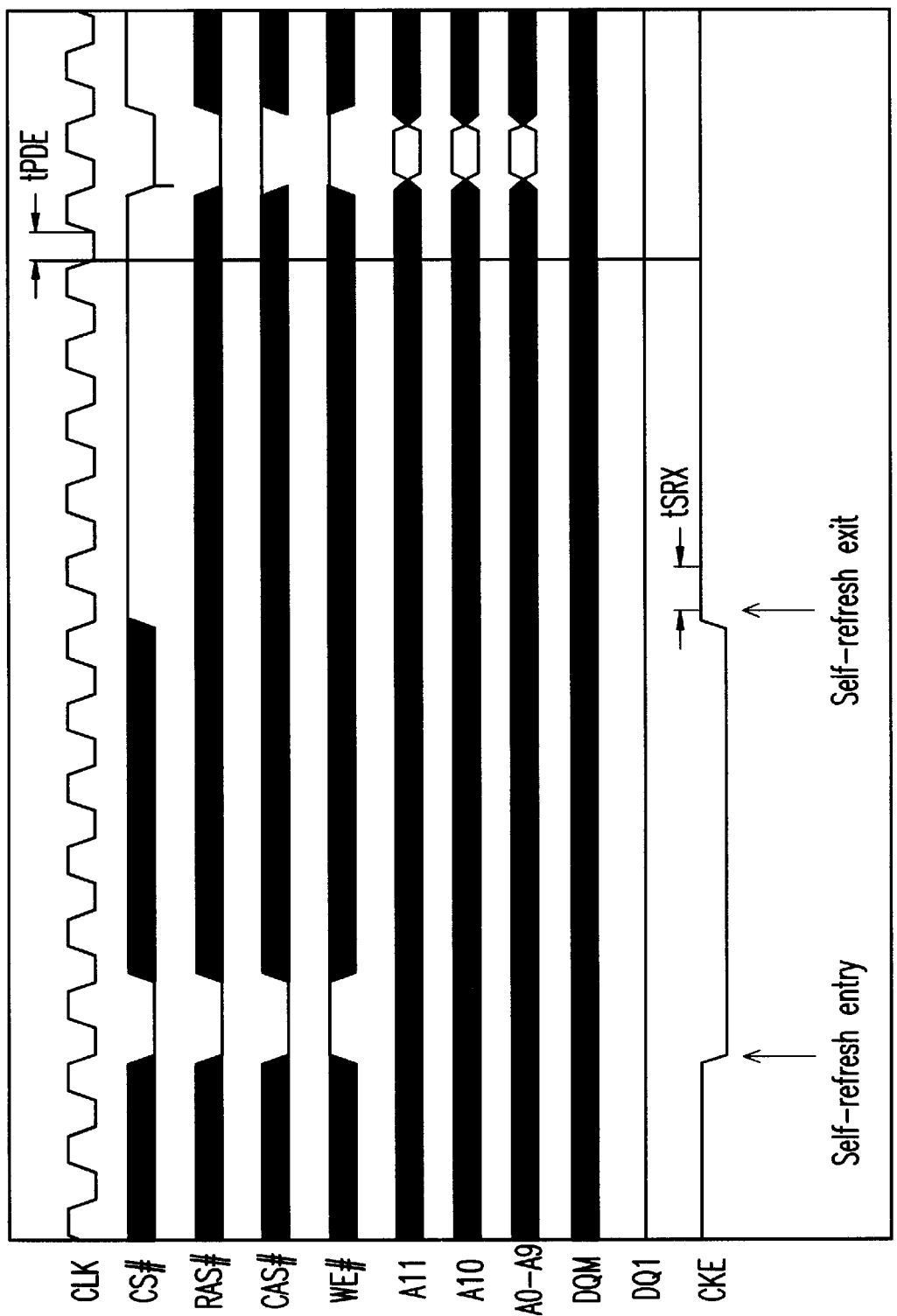
FIG. 1 is a timing diagram showing the signals in various control lines going to a SDRAM.

Reference will now be made in detail to the present preferred embodiments of the invention, examples of which are illustrated in the accompanying drawings. Wherever possible, the same reference numbers are used in the drawings and the description to refer to the same or like parts.

Figure 2:
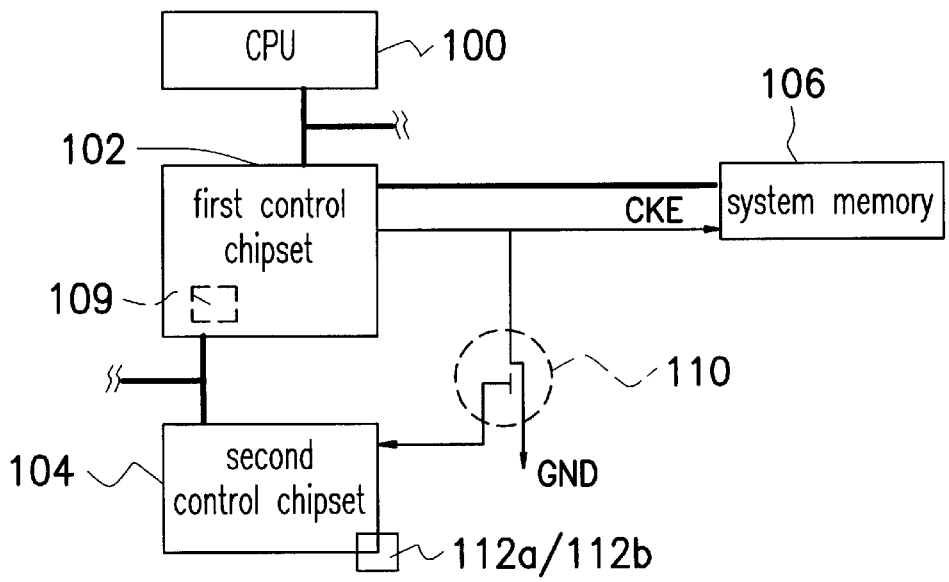
FIG. 2 is a schematic circuit diagram showing the interconnections between various elements for implementing the energy-saving suspend-to-RAM mode in a computer system according to an embodiment of this invention.

FIG. 2 is a schematic circuit diagram showing the interconnections between various elements for implementing the energy-saving suspend-to-RAM mode in a computer system such as a desk-top computer or a notebook computer according to a first embodiment of this invention. The elements needed to operate the energy-saving suspend-to-RAM mode (STR) include a first control chip 102, a second control chip 104, and a memory unit 106. The first control chip 102 serves as the north bridge of a chipset for system control. The first control chip 102 has a register 109 for storing data about a system memory 106 (implemented using SDRAMs) such as the number of memory modules (for example, DIMM) and their memory addresses. The second control chip 104 serves as the south bridge of a chipset for controlling peripheral components. The second control chip 104 is coupled to the first control chip 102. The first control chip 102 and the second control chip 104 can be integrated into a single chipset or fabricated as separated chipsets. A switching device 110 including, for example, one transistor can bet coupled to the second chip set 104 from its gate electrode to a pin of, i.e., general purpose input/output (GPIO). The drain region of the switching device 110 is coupled to the memory unit 106 at the CKE pin. The memory unit 112a/112b is coupled to the second control chip 104 for temporarily storing data coming from the register 109.

Figure 3A:
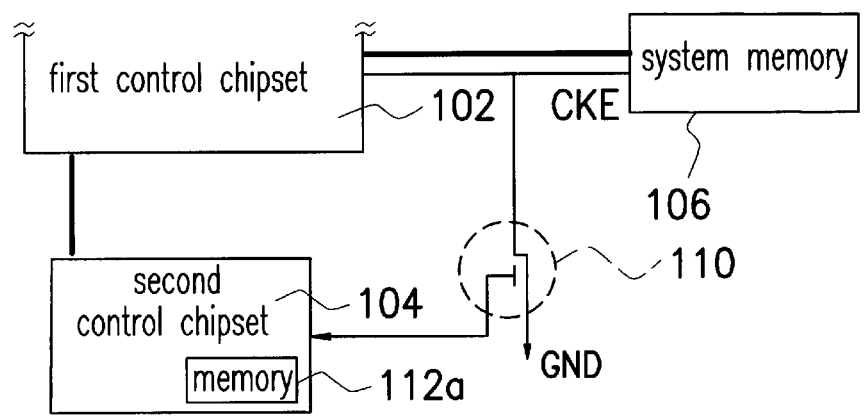
FIGS. 3A and 3B are circuit diagrams showing two implementations of the voltage converter in FIG. 2.
Figure 3B:
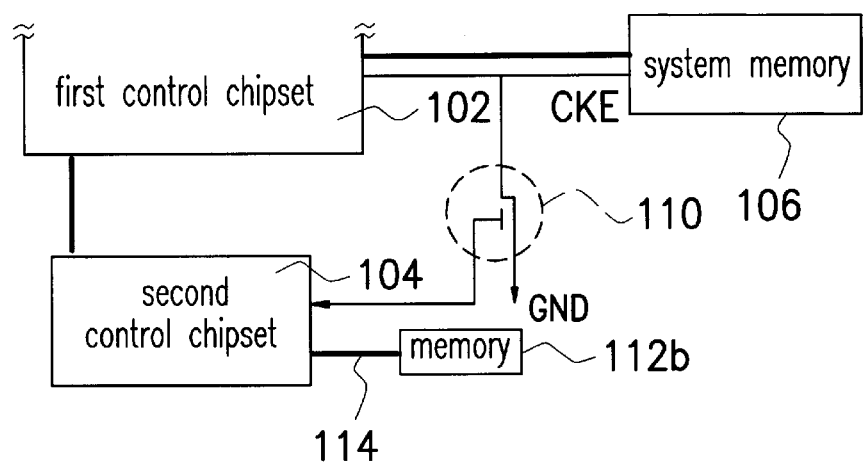

The switching device 110 can be implemented using a circuit as shown in FIG. 3A or 3B. As shown in FIG. 3A or 3B, the voltage converter 108 comprises a first transistor Q1 and a second transistor Q2. The drain terminal of the first transistor Q1 is coupled to a voltage source $V_{cc}$. The source terminal of the second transistor Q2 is connected to a ground wire. A node point N-between the first transistor Q1 and the second transistor Q2 is coupled to the clock-enable pin CKE of the system memory 106 and also one of the pins of the first control chip 102. To switch the computer system into the STR mode of operation, the first transistor Q1 is turned off while the second transistor Q2 is turned on so that voltage level of the clock-enable pin CKE is pulled down. It is possible to integrate the memory unit 112a with the first control chip 102 as shown in FIG. 3A. It is also possible that the memory unit 112b is externally coupled to the memory unit second chipset 104 through the bus 114 as shown in FIG. 3B.

In brief, power to the first control chip (the north bridge) is entirely cut off in the energy-saving STR mode. This is because SDRAM has self-refreshing capability that does not require additional power. Hence, power is saved. In addition, before entering the STR mode, data about the SDRAM, such as the number of DIMM modules and the memory addresses, stored inside a register within the north bridge are transferred to a memory unit under the direction of the second control chip (the south bridge). Therefore, normal mode of operation can be resumed by copying back the data from the memory unit to the north bridge register, and no time is wasted to re-establish data about system memory from scratch during mode switching.

Figure 4:
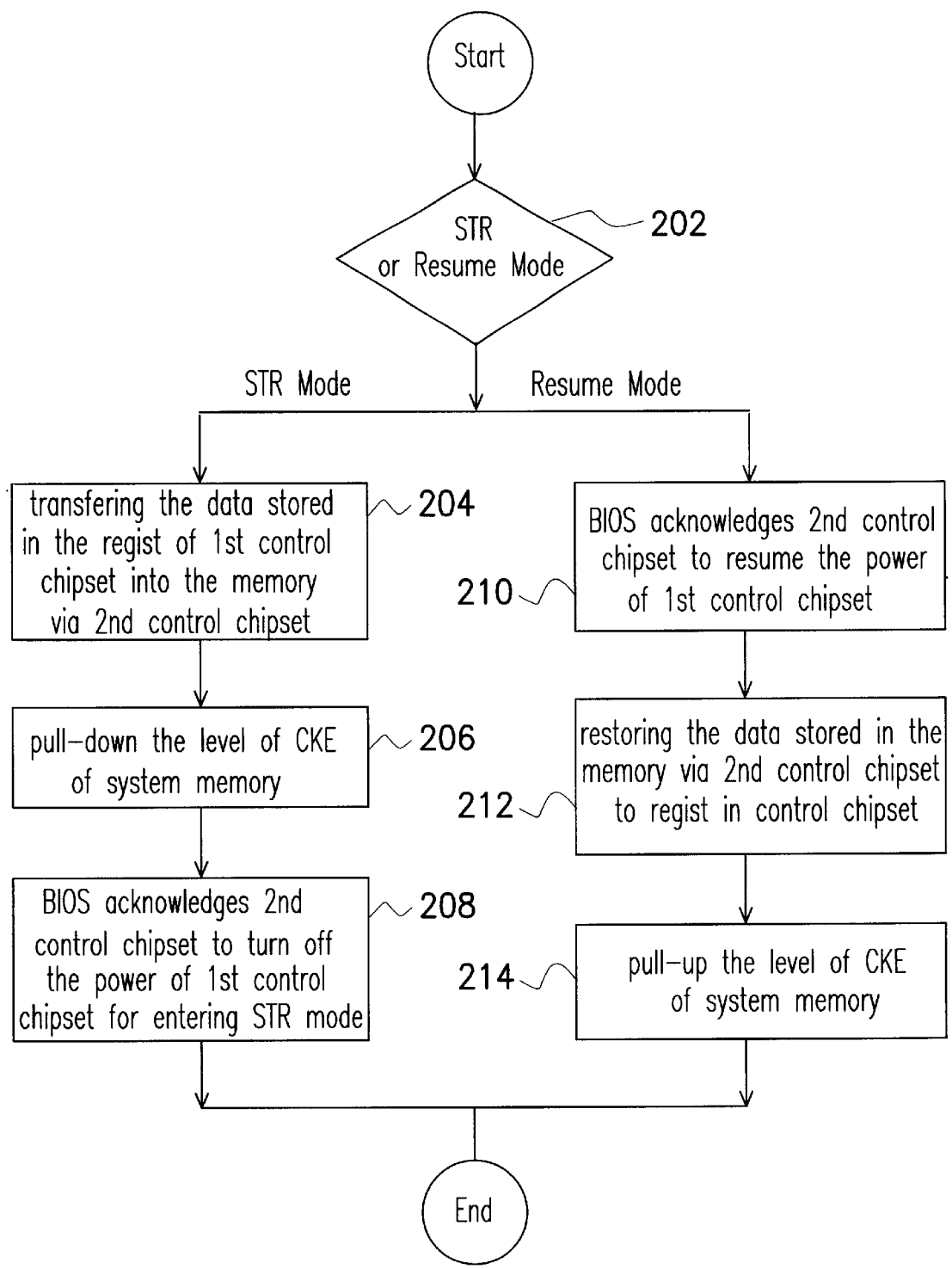
FIG. 4 is a block diagram showing the steps for activating the energy-saving STR mode from a normal mode and returning to a normal mode from a STR mode according to this invention.

FIG. 4 is a flow chart showing the steps for activating the energy-saving STR mode from a normal mode and returning to a normal mode from a STR mode according to this invention. The energy saving method can be applied to a computer system such as a desktop computer or a notebook computer. The elements needed to operate the energy-saving STR mode include a central processing unit (CPU), a first control chip (for example, system control north bridge chipset) that couples to the CPU, a second control chip (for example, peripheral device control south bridge chipset) and a system memory (or SDRAM). The first and the second control chips are coupled together using a bus (for example, a PCI bus), and the system memory is coupled to the first control chip.

In step 202, the system decides whether to switch from a normal mode into a STR mode or to switch back from a STR mode to the normal mode. If the computer system needs to switch from normal mode into the STR mode, step 204 is carried out. In step 204, data stored inside a register within the first control chip are transferred to a memory unit under the direction of the second control chip. Data inside the register includes such information as the number of DIMM modules and the memory addresses. In step 206, voltage level of the clock-enable CKE pin of the system memory is pulled down. The voltage level can be pulled down using a circuit such as the one shown in FIG. 2A or 2B. In step 208, according to a signal from a BIOS, the second control chip cut off power to the first control chip so that the computer system enters the STR mode of operation and reduces its energy consumption.

On the other hand, if the system is already in the STR mode and wants to switch back to the normal mode of operation, step 210 is carried out. In step 210, a signal from the BIOS informs the second control chip to power up the first control chip. In step 212, voltage level of the CKE pin is pulled up using the circuits as shown in FIG. 2A or 2B. In step 214, data inside the memory unit are returned to the register within the first control chip under the direction of the second control chip. Hence, normal operation of the computer system is resumed. Since important system memory data are stored in the memory unit before switching into the STR mode, there is no need to re-establish those data from scratch again.

In summary, the advantages of the invention include:
1. To switch from a normal mode to a STR mode, a signal is sent from the BIOS to the second control chip (a south bridge). The second control chip then switches off power to the first control chip (a north bridge). Without power going to the north bridge, much energy is saved.

2. The voltage level of the clock-enable pin can be pulled down under the direction of either the south bridge or the north bridge.

3. Before switching to the STR mode of operation, important data related to the system memory inside a north bridge register are transferred to a memory unit. The data can be returned from the memorized unit to the register before getting back to the normal mode. Since important system memory data are not lost, normal operation can be resumed without having to retrieve system memory data anew.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of implementing a suspend-to-RAM (STR) mode of operation in a computer system having a central processing unit (CPU), a first control chip coupled to the CPU, a second control chip and a system memory, wherein the system memory is coupled to the first control chip and has a self-refresh mode, the method comprising:

deciding whether the computer system needs to switch into the STR mode or a normal mode of operation, such that if the computer system needs to switch into the STR mode of operation, then transferring data from a register within the first control chip to a memory unit coupled to the second control chip;

pulling down the voltage level at a clock-enable pin of the system memory; and cutting off power to the first control chip completely under the direction of the second control chip on receiving a signal from a basic input/output system (BIOS) so that the system starts operating in the STR mode, whereas if the computer system needs to switch back from the STR mode to the normal mode of operation, the following steps are executed, including:

resuming the supply of power to the first control chip under the direction of the second control chip on receiving a signal from the BIOS;

storing the data in the memory unit to the register of the first control chip; and pulling up the voltage level at the clock-enable pin of the system memory, so as to allow the computer system to return to the normal mode.

2. The method of claim 1, wherein the step of pulling down the voltage level at the clock-enable pin of the system memory is under the direction of the first control chip.

3. The method of claim 1, wherein the step of pulling down the voltage level at the clock-enable pin of the system memory is achieved by a switch, the switch being coupled to the clock-enable pin of the memory system and one of the pins of the second control chip.

4. The method of claim 1, wherein the memory unit is positioned inside the second control chip.

5. The method of claim 1, wherein the memory unit is positioned outside the second control chip, but is connected to the second control chip by means of a system management bus.

6. The method of claim 4, wherein the memory unit is implemented using complementary metal-oxide-semiconductor random access memory (CMOS-RAM).

7. The method of claim 4, wherein the memory unit is implemented using electrically erasable programmable read-only-memory (EEPROM).

8. The method of claim 5, wherein the memory unit is implemented using electrically erasable programmable read-only-memory (EEPROM).

9. The method of claim 1, wherein the system memory is implemented using synchronous dynamic random access memory (SDRAM).

10. The method of claim 1, wherein the first control chip and the second control chip are integrated into a single control chip.

11. The method of claim 1, wherein the first control chip includes the north bridge of a chipset and the second control chip includes the south bridge of a chipset.

12. A device for implementing a suspend-to-RAM mode of operation in a computer system, comprising:

a first control chip having a register therein, wherein the register is used for storing system memory data, wherein a system memory is coupled to the first control chip and has a self-refresh mode;

a second control chip coupled to the first control chip, wherein the second control chip is used for cutting the power supply to the first control chip on receiving a signal from a basic input/output system (BIOS);

a voltage converter coupled to the second control chip and a clock-enable pin of the system memory, wherein the voltage converter is used for pulling down the voltage level at the clock-enable pin; and a memory unit coupled to the second control chip, wherein the memory unit is used for storing data coming from the register inside the first control chip, wherein the steps for switching the computer system into the STR mode of operation include transferring data inside the register within the first control chip to the memory unit, pulling down the voltage level at the clock-enable pin of the system memory, and terminating the supply of power to the first control chip completely upon receiving a signal from the BIOS.

13. The device of claim 12, wherein the voltage converter includes a transistor switch.

14. The device of claim 12, wherein the voltage converter is connected to a general-purpose input/output (GPIO) pin of the second control chip.

15. The device of claim 12, wherein the memory unit is positioned inside the second control chip.

16. The device of claim 12, wherein the memory unit is positioned outside the second control chip, but is coupled to the second control chip through a system management bus.

17. The device of claim 15, wherein the memory unit is implemented using a complementary metal-oxide-semiconductor random access memory (CMOS-RAM).

18. The device of claim 15, wherein the memory unit is implemented using a electrically erasable programmable read-only-memory (EEPROM).

19. The device of claim 16, wherein the memory unit is implemented using electrically erasable programmable read-only-memory (EEPROM).

20. The device of claim 12, wherein the system memory is implemented using synchronous dynamic random access memory (SDRAM).

21. The device of claim 12, wherein the first control chip includes the north bridge of a chipset and the second control chip includes the south bridge of a chipset.

22. The device of claim 12, wherein the first control chip and the second control chip are integrated into a single chip.

* * * * *